Aug. 22, 1933.　　H. R. KEYES ET AL　　1,923,542
V-SHAPED BELT
Filed Oct. 7, 1932
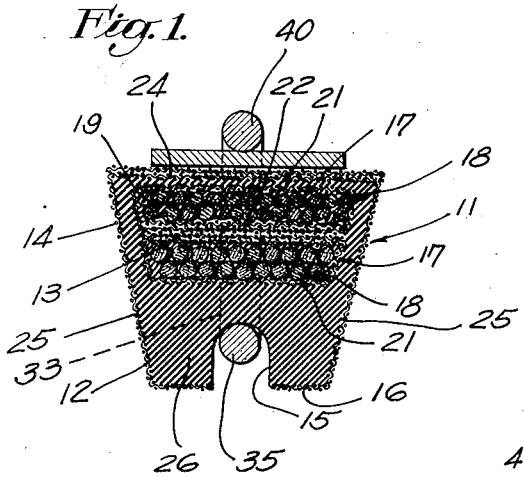
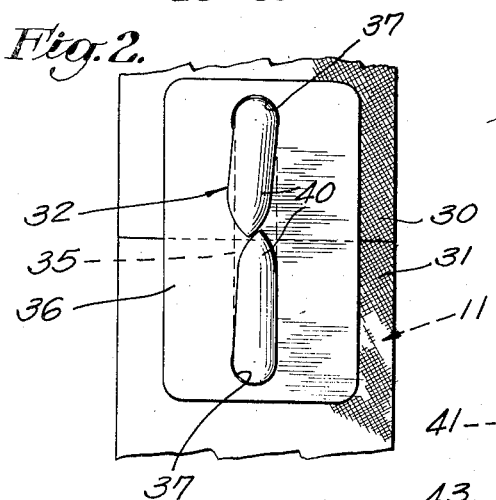
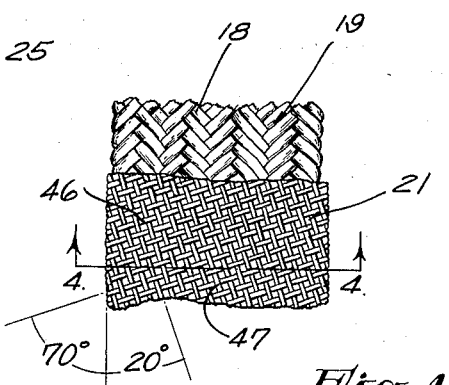
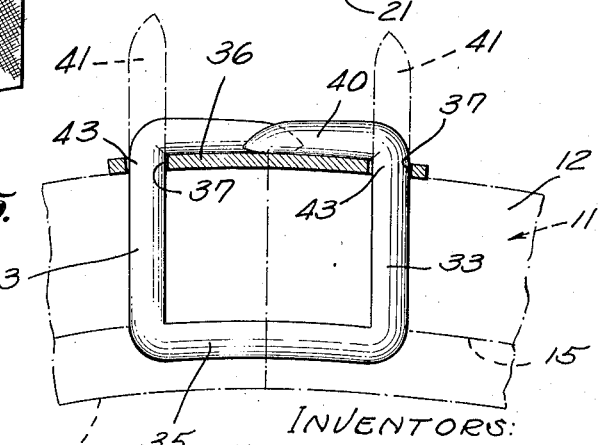
INVENTORS:
HOMER RICHARDS KEYES,
CHARLES HOMER KEYES,
ATTORNEY.

Patented Aug. 22, 1933

1,923,542

UNITED STATES PATENT OFFICE 1,923,542

V-SHAPED BELT

Homer Richards Keyes and Charles Homer Keyes, Los Angeles, Calif.; said Charles Homer Keyes assignor to Homer Richard Keyes Application October 7, 1932. Serial No. 636,650

1 Claim. (Cl. 74—63)

Our invention relates to belting and particularly to those known as V-belts. V-belts as now extensively used are molded in continuous or looped form and are reinforced in various manners, some by use of fabric strips, longitudinally extending cords, or combinations of cord and fabric. Many of the belts of this character give commercially satisfactory service but owing to internal friction will, after periods of use of varying lengths, become fatigued.

It is an object of our invention to provide a molded rubber belt, preferably of V-shape, having a form of longitudinal reinforcement which accomplishes in belts of this character several new and useful results. For example, the new reinforcement, in combination with other features of the invention, produces a belting of higher fatigue point and makes it possible to manufacture the belt in strip form from which portions may be cut and made into loop belts by joining the ends thereof together. Accordingly, the invention makes it possible to produce a commercial belt of V-shape consisting of a length of reinforced belt stock having the ends thereof joined by a coupling device of practical form, thereby eliminating the present necessity in the manufacture of V-belts of molding each belt individually, and very greatly reducing the labor required in the manufacture of V-belts, which are now made by hand.

It is an object of the invention to provide a V-belt of rubber material or compound having a longitudinal reinforcing element formed of longitudinally directed strands braided together or intertwined. This reinforcing element flexes freely with the belt but provides a structure extending longitudinally through the belt and to the ends thereof through which a simple form of coupling means may be passed which is capable of very securely retaining the coupling means so that it will not pull out in the ordinary service of the belt.

A further object of the invention is to provide a simple form of coupling means and a belt structure capable of receiving such coupling means in such a manner that the passage of the V-belt over a V-grooved pulley will not produce a pounding action on the coupling.

A further object of the invention is to provide a molded belt having a longitudinal reinforcing element therein comprised of a braid and a cover member for such braid to prevent spreading thereof.

A further object of the invention is to provide a V-belt having a form-fitting side wall, accomplished by use of a longitudinal groove in the bottom of the belt, which groove makes it possible for the belt to readily fit itself to the V-shaped groove of a pulley, thereby making it possible to use a single belt stock for a number of pulley-wall angles. Although made in longitudinal form and joined together by use of a coupling means, actual comparative tests and actual service on automobiles and other machines have demonstrated that belts made in accordance with our invention are superior to those now in general use and, as will be readily recognized, may be produced at a lower cost of manufacture.

Further objects and advantages of the invention will be made evident throughout the following part of the specification.

Referring to the drawing, which is for illustrative purposes only,

Fig. 1 is a cross sectional view showing an end of a belt embodying a preferred form of our invention, and showing our simple coupling means in cross section.

Fig. 2 is a plan view corresponding to Fig. 1.

Fig. 3 is a fragmentary plan view of a portion of a longitudinal reinforcing element employed in the invention, a portion of the covering means thereof being stripped back to show the enclosed braid.

Fig. 4 is a cross section on a plane represented by the line 4—4 of Fig. 3.

Fig. 5 is a side elevation of the coupling means.

As best shown in Fig. 1, a preferred embodiment of our new V-belt 11 comprises an elongated body 12 of rubber material, such as rubber compound, having therein reinforcing means 13 extending longitudinally of the belt and having a fabric cover 14 overlying the external surfaces of the belt, with the exception of a longitudinal groove 15 formed in the bottom 16 of the belt.

The reinforcing means 13 may comprise one or more longitudinal reinforcing elements 17, depending upon the size and characteristics of any particular belt. In the disclosure two of such longitudinal reinforcing elements 17 are shown, each of which comprises a plurality of longitudinal strands 18, preferably of vegetable or cotton fiber, which are braided together. Although these strands extend essentially longitudinally, they are intertwined by the braiding thereof so as to be combined into a durable structure. In the preferred practice of the invention the cords 18 are braided to form flat braids 19 in which the strands lie in crossing relation of ninety degrees one to the other or of forty-five degrees relative to the length of the braid 19. For the purpose of preventing spreading of the braid 19, a reinforcing cover 21 is placed thereon, this cover being preferably in the form of a strip of rubberized fabric of sufficient width that it may be folded entirely around the braid 19 and so that the ends thereof will overlap as shown at 22 in Figs. 1 and 2. The braid 19 is impregnated with rubber, preferably by dipping the same in a rubber cement solution, and is accordingly cemented together as a result thereof.

One or more braids 19 of considerable length, or reinforcing elements comprised of a braid 19 with a fabric cover thereon, are placed together in overlying relation, after which raw rubber compound is applied to cover the reinforcing means 13 thereby formed. The body of rubber material 12 is formed with the channel 15 in the lower wall thereof and before curing the belt is provided with the cover layer of rubberized fabric 14 which overlaps the top face 24 of the V-belt 11. For curing, the raw V-belt assembly is wound in a spiral groove formed in a cylindrical member, and the cylindrical member is wound with canvas strips, thereby holding the V-belt tightly in the forming groove during the application of heat to cure the rubber compound. It will be seen that a considerable length of belt may be cured in a single operation and with a minimum of labor as compared with the old methods of individually handling and curing belt loops.

The downwardly converging side walls 25 of the belt 11 are disposed at angles to agree with a selected shape of pulley groove. The belt may be used, however, with pulley grooves having side walls of greater angularity than the belt, for the reason that the lower or inner portion 26 of the belt is of resilient character. The longitudinal groove 15 permits the rubber material in the lower portion 26 of the belt to be readily flexed inwardly so that the side walls 25, or at least the inner or lower portions thereof, will conform to walls disposed at greater angularity than the side walls 25. The groove 15 in the lower portion of the V-belt 11 has additional utility in providing a recess in the ends of a belt strip in which a coupling means may be submerged and so that such coupling means will not be brought into contact with the pulley over which the belt runs in a manner to produce a pounding action.

A principle of our invention is that a V-belt of reinforced rubber material is provided which may be formed into continuous belt loops and the ends thereof joined together in a strong and relatively permanent manner. Our invention further includes a simple and effective coupling means, as will be noted from the following description. In Fig. 2, ends 30 and 31 of the V-belt 11 are shown in engagement and there held by a coupling means 32 which, as shown in Fig. 5, comprises a pair of metal tines 33 which are joined together at their lower ends by a connecting strip 35 and have their upper ends secured against separation by a flat plate or link 36 having openings 37 through which the upper portions of the tines 33 pass. The securing means 32 may be readily made from steel wire stock which is bent to form a staple having tines or prongs 33 connected by a cross extension 35. The securing means or staple is applied to the ends 30 and 31 of the belt 11 in such manner that the tines 33 pass approximately centrally through the longitudinal reinforcing means 13. The portion 35 thereof rests in end portions of the groove or channel 15. The securing means 32, with the points 40 thereof extended as indicated by dotted lines 41 in Fig. 5, is forced or driven through the ends 30 and 31 of the belt 15, and the plate 36 is then placed over the extended ends 40, whereupon they are bent inwardly to engage the outer face of the plate 36, as indicated in full lines in Figs. 2 and 5. The plate 36, engaging the outer portions of the tines 33 at points 43 in Fig. 5, positively holds the tines 33 from spreading due to forces applied by the belt 11 when it is in use. The employment of a coupling means of the character shown is made possible by the use of the improved longitudinal reinforcing means which, being braided, provides a strong and durable structure through which the tines 33 of the coupling means 32 may pass and which will not permit the tines to pull out from the ends of the belt 11 in service. Ordinary longitudinal reinforcing means made from rubberized fabric rolled or folded longitudinally will not secure the coupling means from pulling out of the ends of the belt for the reason that the crossing strands of the fabric may be readily raveled or pulled from the longitudinal strands of the fabric. In our belt structure the braid 19 does not provide laterally woven threads or cords but instead thereof provides crossing cords which extend the entire length of the belt and are intertwined in such a manner that the tines 33 will not pull therethrough when force is applied. We have found that the strength of the longitudinal reinforcing means 22 is contributed to by the placement of the fabric cover strip 21 on the braid so as to prevent spreading of the braid, and is further contributed to by the manner in which the rubberized fabric forming the cover strip 21 is cut. We find that by cutting the fabric so that the warp and woof cords 46 and 47 extend respectively at angles of approximately seventy and twenty degrees relative to the length of the strip and of the braid 19 to which the fabric cover 21 is applied, a longitudinal reinforcing means is produced having greater resistance to the pulling out of the staple than where the fabric cover 21 is cut on a forty-five degree bias.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claim.

We claim as our invention:

A loop belt of the character described, including: a V-sh--ed belt member having a longitudinal groove in the bottom thereof; and a coupling means for securing the ends of said belt member together comprising a bar and a pair of essentially parallel prongs extending from the ends of said bar, said bar being received in the end portions of said groove and said prongs projecting outwardly through the ends of said belt member.

HOMER RICHARDS KEYES.
CHARLES HOMER KEYES.